United States Patent [19]

Farnham et al.

[11] Patent Number: 4,524,196

[45] Date of Patent: * Jun. 18, 1985

[54] PROCESS FOR PREPARING "LIVING" POLYMERS

[75] Inventors: William B. Farnham; Dotsevi Y. Sogah, both of Wilmington, Del.

[73] Assignee: E. I. Du Pont de Nemours and Company, Wilmington, Del.

[*] Notice: The portion of the term of this patent subsequent to Nov. 8, 2000 has been disclaimed.

[21] Appl. No.: 549,408

[22] Filed: Nov. 7, 1983

Related U.S. Application Data

[63] Continuation-in-part of Ser. No. 389,111, Jun. 17, 1982, Pat. No. 4,414,372.

[51] Int. Cl.³ ............................................. C08F 4/16

[52] U.S. Cl. ..................... 526/190; 526/126; 526/194; 526/329.7; 526/329.5; 526/278; 525/330.3; 525/359.6

[58] Field of Search ................. 526/126, 190, 194

[56] References Cited

U.S. PATENT DOCUMENTS 3,272,786  9/1966  Perry .................................... 526/190
4,417,034  11/1983  Webster ............................ 526/190

Primary Examiner—Joseph L. Schofer
Assistant Examiner—Peter F. Kulkosky

[57] ABSTRACT

"Living" polymers and their preparation from acrylic-type or maleimide monomers and organosilicon, -tin or -germanium initiators.

48 Claims, No Drawings

PROCESS FOR PREPARING "LIVING" POLYMERS

CROSS-REFERENCE TO RELATED APPLICATIONS

This is a continuation-in-part of application Ser. No. 389,111, filed June 17, 1982 and now U.S. Pat. No. 4,414,372. Related subject matter is disclosed and claimed by different inventive entity in commonly assigned application Ser. No. which is a continuation-in-part of application Ser. No. 389,110, filed June 17, 1982 and now U.S. Pat. No. 4,417,034.

DESCRIPTION

1. Technical Field

This invention relates to a process for polymerizing polar α-olefinic monomers to "living" polymers and to the "living" polymers produced by such a process.

2. Background

The 1:1 addition of α,β-unsaturated esters, ketones, and nitriles to activated "donor" compounds, for example, silicon- or tin-containing "donor" compounds, is well known. Such reactions may be referred to as Michael type addition reactions and are catalyzed by bases, such as a fluoride or cyanide, or by Lewis acids, such as zinc chloride, boron trifluoride, titanium tetrachloride, or hydrogen bromide.

K. Saigo et al., Chem. Letters, 2, 163 (1976) disclose that when methylvinyl ketone or cyclohexenone is employed as a Michael acceptor in the presence of O-silylated ketene acetals and titanium tetrachloride, the desired product is obtained in low yields and a polymeric by-product is produced. The polymer was not isolated or identified and means are disclosed for minimizing the by-product by modifying the titanium tetrachloride catalyst by including therewith tetraisopropyl titanate.

U.S.S.R. Pat. No. 717,057 discloses organosilicon acetals of the formula $$RO-CH(CH_3)-OSiR'_{3-n}(OR'')_n,$$

and their use as intermediates in the preparation of perfumes and in the production of polymers and flotation agents, wherein R is $C_3H_7$, $C_6H_5$, $CH=CCH_2$, $CH\equiv CC(CH_3)_2$ or menthyl; R' is $C_{1-4}$ alkyl or $C_6H_5OCH(CH_3)$, and n is 0 or 1.

U.S.S.R. Pat. No. 715,583 discloses trimethylsiloxyethyl esters of the formula $RC(O)X-CH(CH_3)-OSi(CH_3)_3$, useful as intermediates in the manufacture of medicinals, plasticizers, and polymers, and as agricultural pesticides and perfumes and in food manufacture, wherein X is oxygen or sulfur and R is lower alkyl, chloroalkyl or optionally substituted alkenyl.

Stork et al., JACS 95, 6152 (1973) disclose the use of α-silylated vinyl ketones to prevent the polymerization of simple alkyl vinyl ketones via their enolate ions during Michael addition reactions.

The use of trialkylsilyl groups as temporary protectants for hydroxyl functions, removal by subsequent hydrolysis, is well known in the art, for example, Cunico et al., J. Org. Chem. 45, 4797, (1980).

U.S. Pat. No. 4,351,924 discloses ω- and α,ω-hydroxyhydrocarbyl-(alkyl methacrylate) polymers prepared by anionic polymerization, and block and star polymers prepared therefrom by reaction with multifunctional bromomethyl compounds.

U.S. Pat. No. 4,293,674 discloses dienyl esters of methacrylic acid, and homopolymers and copolymers thereof prepared by anionic polymerization.

Sato et al., Polymer 24, 1018 (1983) disclose syntheses of block copolymers by reacting living poly(N-phenylmethacrylamide) radicals with vinyl monomers such as methyl methacrylate.

DISCLOSURE OF THE INVENTION

For further comprehension of the invention, and of the objects and advantages thereof, reference may be made to the following description and to the appended claims in which the various novel features of the invention are more particularly set forth.

The invention resides in the process comprising polymerizing the monomer selected from the group consisting of $CH_2=C(Y)X$,

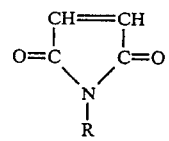

and mixtures thereof wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$;

each $R^1$, independently, is a hydrocarbyl radical which is an aliphatic, alicyclic, aromatic or mixed aliphatic-aromatic radical containing up to 20 carbon atoms;

R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions; and each of R' and R'' is independently selected from $C_{1-4}$ alkyl by contacting the one or more monomers under polymerizing conditions with:

(i) the initiator of the formula $(R^1)_3MZ$ wherein:

$R^1$ is as defined above;

Z is an activating substituent selected from the group consisting of

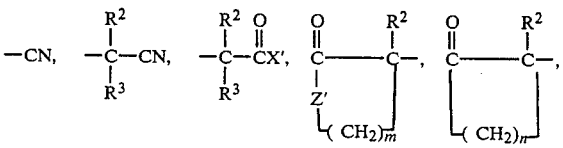

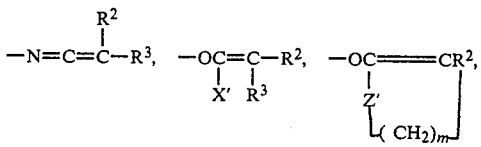

-continued $$-O\underset{\underset{(CH_2)_n}{\rule{0.5em}{0.1ex}}}{C}=CR^2$$

and mixtures thereof

X' is as defined above for the monomer;
each of $R^2$ and $R^3$ is independently selected from H and hydrocarbyl, defined as for R above;
Z' is O or NR';
m is 2, 3 or 4;
n is 3, 4 or 5; and
M is Si, Sn, or Ge,
provided, however, when Z is $$-O\underset{\underset{(CH_2)_n}{\rule{0.5em}{0.1ex}}}{C}=CR^2 \text{ or } \overset{O}{\underset{\underset{(CH_2)_n}{\rule{0.5em}{0.1ex}}}{\overset{\|}{C}}}-\overset{R^2}{\underset{}{C}}-$$

M is Sn or Ge; and (ii) a co-catalyst which is a source of bifluoride ions $HF_2^{\ominus}$, to produce "living" polymer having repeat units of the one or more monomers, said process further characterized in that:

(a) $R^1$ is H, provided that at least one $R^1$ group is not H; and/or (b) R is a polymeric radical containing at least 20 carbon atoms and optionally containing one or more ether oxygen atoms within aliphatic segments thereof and optionally containing one or more functional substituents that are unreactive under polymerizing conditions; and/or (c) at least one of any R group in the monomer contains one or more reactive substituents of the formula $-Z'(O)C-C(Y^1)=CH_2$ wherein $Y^1$ is H or $CH_3$ and Z' is as defined above; and/or (d) the initiator is of the formula $(R^1)_2M(Z^1)_2$ or $O[M(R^1)_2Z^1]_2$ wherein $R^1$ and M are as defined above and $Z^1$ is $$-O\underset{X'}{\overset{}{C}}=\underset{R^3}{\overset{}{C}}-R^2$$

wherein X', $R^2$ and $R^3$ are as defined above; and/or (e) at least one of any R, $R^2$ and $R^3$ in the initiator contains one or more initiating substitutents of the formula $-Z^2-M(R^1)_3$ wherein M and $R^1$ are as defined above; and
$Z^2$ is a diradical selected from the group consisting of $$-Z'-\underset{\underset{O-}{\rule{0.5em}{0.1ex}}}{C}=C(R^2)(R^3), \quad -\underset{}{C}(R^2)-\overset{O}{\overset{\|}{C}}X', \quad -Z'-\overset{O}{\overset{\|}{C}}-\underset{R^3}{\overset{R^2}{C}}-,$$

$$-\underset{\underset{O-}{\rule{0.5em}{0.1ex}}}{C}(R^2)=CX', \quad \overset{O}{\overset{\|}{C}}\underset{\underset{(CH_2)_m}{\rule{0.5em}{0.1ex}}}{-\underset{Z'}{C}-}, \quad -O\underset{\underset{(CH_2)_m}{\rule{0.5em}{0.1ex}}}{C}=\underset{Z'}{C}-,$$

and mixtures thereof, wherein $R^2$, $R^3$, X', Z', m and n are as defined above, provided, however, when $Z^2$ is $$\overset{O}{\overset{\|}{C}}\underset{\underset{(CH_2)_n}{\rule{0.5em}{0.1ex}}}{-\underset{}{C}-}, \quad -O\underset{\underset{(CH_2)_n}{\rule{0.5em}{0.1ex}}}{C}=C-, \quad -\underset{CN}{\overset{}{C}}-R^2$$

and mixtures thereof, wherein $R^2$, $R^3$, X', Z', m and n are as defined above, provided, however, when $Z^2$ is $$\overset{O}{\overset{\|}{C}}\underset{\underset{(CH_2)_n}{\rule{0.5em}{0.1ex}}}{-\underset{}{C}-},$$

M is Sn or Ge; and/or (f) Z is selected from the group consisting of —SR, —OP(NR'R")$_2$, —OP(OR$^1$)$_2$, —OP[OSi(R$^1$)$_3$]$_2$ and mixtures thereof, wherein R, $R^1$, R' and R" are as defined above; and/or (g) $R^2$ and $R^3$ taken together are

[bicyclic structure with $H_3C$, $CH_3$, $CH_3$ groups]

provided, however, Z is $$-\underset{R^3}{\overset{R^2}{C}}-\overset{O}{\overset{\|}{C}}X' \text{ or } -O\underset{X'}{\overset{}{C}}=C(R^2)(R^3)$$

and/or $Z^2$ is $$-Z'-\overset{O}{\overset{\|}{C}}-C(R^2)(R^3)-;$$

and/or (h) X' and either $R^2$ or $R^3$ taken together are $$\underset{R^1}{\overset{}{\underset{\diagdown}{O}}}\overset{}{\underset{\diagup}{C}}\underset{R^1}{\overset{}{\underset{\diagdown}{O}}}$$

provided, however, Z is $$-\underset{R^3}{\overset{R^2}{C}}-\overset{O}{\overset{\|}{C}}X' \text{ or } -O\underset{X'}{\overset{}{C}}=C(R^2)(R^3)$$

and/or $Z^2$ is $$-\underset{}{C}(R^2)-\overset{O}{\overset{\|}{C}}X'.$$

Other co-catalysts which have been independently discovered to be effective in the invention process include sources of fluoride, cyanide or azide ions, suitable Lewis acids, for example, zinc chloride, bromide or iodide, boron trifluoride, alkylaluminum oxides and alkylaluminum chlorides.

By "living" polymer is meant a polymer of the invention which contains at least one active terminal group and is capable of polymerizing further in the presence of monomer(s) and co-catalyst.

It will be understood by one skilled in the art that the last four members of the aforesaid group from which the activating substituent Z is selected are the respective ketene imine or enol forms of the previous four members of the group. The mixtures of such members which are operable herein include, but are not limited to, the corresponding cyano-imine or keto-enol mixtures.

The polymers produced by the process of the invention are "living" polymers of the formula

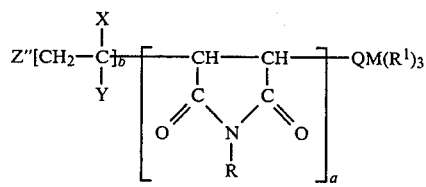

wherein:

Z" is selected from the group consisting of

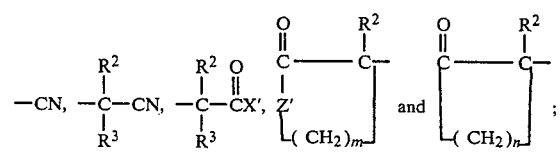

each of a and b is independently selected from 0 or a number in the range 1 to about 100,000, provided, however, (a+b) is at least 3;

Q is the divalent radical selected from the group consisting of

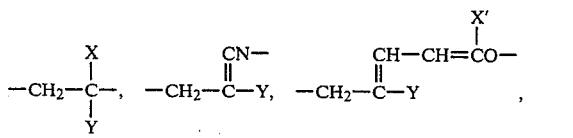

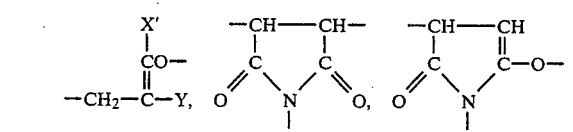

and mixtures thereof; and all remaining symbols are as defined above, said polymer further characterized in that:

(a) $R^1$ is H, provided that at least one $R^1$ group is not H; and/or (b) Z" is selected from $-P(O)(NR'R'')_2$, $-P(O)(OR^1)_2$, $-P(O)[OSi(R^1)_3]_2$ and $-SR$; and/or (c) the "living" polymer is of the formula $R_p([Z^3\overline{P}QM(R^1)_{3-k}]_{1+k}(O)_k)_p$ wherein Rp is a hydrocarbyl radical which is aliphatic, alicyclic, aromatic or mixed aliphatic-aromatic containing up to 20 carbon atoms, or a polymeric radical containing at least 20 carbon atoms, of valence p, optionally containing one or more ether oxygen atoms, keto groups and/or functional substituents that are unreactive under polymerizing conditions;

$Z^3$ is a diradical selected from the group consisting of

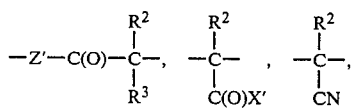

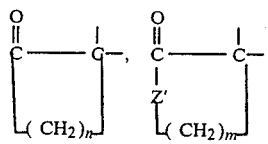

and mixtures thereof;

Z', $R^2$, $R^3$, X', m and n are as defined above;

$\overline{P}$ is a divalent polymeric radical of the formula

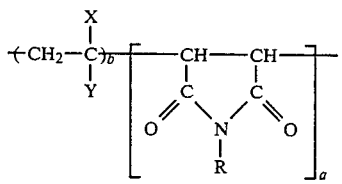

wherein

X, Y, R, a and b are as defined above;

Q, M and $R^1$ are as defined above;

k is 0 or 1; and p is an integer and is at least 1 when k is 1 or at least 2 when k is 0, provided, however, (i) when $Z^3$ is

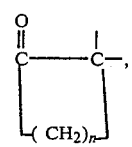

ps M is Sn or Ge;

(ii) when $Z^3$ is

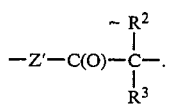

$R^2$ and $R^3$ taken together is

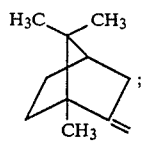

and (iii) when $Z^3$ is

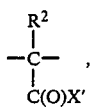

$R^2$ and $X'$ taken together is

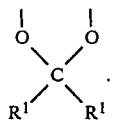

It is readily apparent that the five members of the group defining $Z''$ are the same as the first five members of the aforesaid group defining Z and are cyano or keto forms of Z. It also is apparent that Q is a "living" polymer unit provided by the starting monomers of the process of the invention, as originally depicted above, or such unit in its enol or imine form. The "living" polymers contain terminal groups —$M(R^1)_3$ at their "living" ends or, when polymerization is initiated by bifunctional initiators of the formula $(R^1)_2M(Z^1)_2$ or $O[M(R^1)_2Z^1]_2$, central groups —$M(R^1)_2$—O—$M(R^1)_2$—. These terminal or central groups are attached to carbon if the adjacent Q unit is in its keto form, and to a hetero atom (O or N) if the adjacent Q unit is in its enol form. Both tautomeric forms may coexist in a given "living" polymer of the invention.

In the description of the further characterization of the invention, any reference to symbols "as defined above" means not only as defined above in the further characterization but also as defined anywhere hereinabove. This caveat applies particularly to the definitions of R, $R^1$, $R^2$, $R^3$, Z and $Z''$.

The "living" polymer of the invention can be a homopolymer or a copolymer, depending on the monomer or monomers selected for use in the process of the invention. Moreover, as will be discussed more fully hereinafter, the "living" polymer can be linear or branched and, depending on the selection of X, $R_p$ or $Z''$ in the formulas, can be used to prepare crosslinked polymers and block copolymers.

Monomers which are suitable for use in the practice of this invention are, in general, known compounds and include, but are not limited to, the following: methyl methacrylate; butyl methacrylate; sorbyl acrylate and methacrylate; lauryl methacrylate; ethyl acrylate; butyl acrylate; acrylonitrile; methacrylonitrile; 2-ethylhexyl methacrylate; 2-(dimethylamino)ethyl methacrylate; 2-(dimethylamino)ethyl acrylate; 3,3-dimethoxypropyl acrylate; 3-methacryloxypropyl acrylate; 2-acetoxyethyl methacrylate; p-tolyl methacrylate; 2,2,3,3,4,4,4-heptafluorobutyl acrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone; ethyl 2-chloroacrylate; glycidyl methacrylate; 3-methoxypropyl methacrylate; 2-[(1-propenyl)oxy]ethyl methacrylate and acrylate; phenyl acrylate; 2-(trimethylsiloxy)ethyl methacrylate; 2-(methylsiloxy)ethyl methacrylate; allyl acrylate and methacrylate; unsaturated esters of polyols, particularly such esters of α-methylenecarboxylic acids, for example, ethylene glycol diacrylate, diethylene glycol diacrylate, glycerol diacrylate, glyceryl triacrylate, mannitol hexaacrylate, sorbitol hexaacrylates, ethylene glycol dimethacrylate, hexamethylene diol diacrylate, 1,3-propanediol dimethacrylate, 1,2,4-butanetriol trimethacrylate, 1,1,1-trimethylolpropane triacrylate, triethylene glycol diacrylate, 1,4-cyclohexanediol diacrylate, 1,4-benzenediol dimethacrylate, pentaerythritol tetramethacrylate, dipentaerythritol hexaacrylate, pentaerythritol tetraacrylates, 1,3-propanediol diacrylate, 1,5-pentanediol dimethacrylate, the bis-acrylates and methacrylates of polyethylene glycols of molecular weight 200–4000, and α,ω-polycaprolactonediol diacrylate; unsaturated N-alkylated amides, such as methylene bis-(N-methylacrylamide), methylene bis-(N-methylmethacrylamide), ethylene bis-(N-methylmethacrylamide), 1,6-hexamethylene bis-(N-methylacrylamide), bis(γ-N-methylmethacrylamidopropoxy)ethane β-N-methylmethacrylamidoethyl methacrylate; 3,3,4,4,5,5,6,6,6-nonafluorohexyl acrylate; and mixtures thereof. Preferred monomers include methyl methacrylate; glycidyl methacrylate; sorbyl methacrylate; ethyl acrylate; butyl acrylate; sorbyl acrylate; 2-(trimethylsiloxy)ethyl methacrylate; 2-methacryloxyethyl acrylate; 2-acetoxyethyl methacrylate; 2-(dimethylamino)ethyl methacrylate; N-phenyl-N-methylacrylamide; p-xylylene diacrylate; 1,4-bis(2-acryloxyethyl)benzene; pentaerythritol triacrylate; 1,1,1-trimethylolpropane triacrylate; pentaerythritol tetraacrylate; triethylene glycol diacrylate; triethylene glycol dimethacrylate; 1,1,1-trimethylolpropane trimethacrylate; 4-acryloxydiphenylmethane; and hexamethylenediol diacrylate and dimethacrylate. Methyl methacrylate is most preferred.

As indicated above in the definition of R in the formulas for the monomer, substituents that are unreactive under polymerizing conditions include those having oxygen-, nitrogen-, or silicon-containing groups which are devoid of reactive hydrogen atoms. Groups such as $OSi(R^1)_3$ and $CONH_2$ are nonreactive under such conditions and, therefore, can be tolerated. On the other hand, groups such as $CO_2H$ and OH are reactive under polymerizing conditions. In order for monomers containing such groups on the R substituent to be useful in the invention process, the groups must be chemically protected, i.e. deactivated. Monomers containing such deactivated groups are useful in the preparation of polymers which, upon treatment to remove the protective group, have functional sites along the polymer chain. Monomers which contain sufficiently sterically hindered amine and alcohol groups that remain inert under reaction conditions may be used directly without deactivation. The functional sites can impart special properties to the polymer products, including curability and photosensitivity.

The definition of R in the monomer formulas also includes substituents which are reactive under polymerizing conditions and of the formula $CH_2=C(Y^2)-C(O)Z'-$ wherein $Y^2$ and $Z'$ are as defined above. These reactive substituents provide additional centers for initiation of polymerization, leading to the growth of polymeric branches. The reactive substituents are derived from (meth)acrylates or (meth)acrylamides which are themselves operable monomers in the present invention. These substituents can react with initiators of the invention to provide new initiating sites from which polymeric branches can grow in the presence of monomer(s) and cocatalyst.

Initiators which are useful in the invention process include, but are not limited to, the following: [(1-methoxy-2-methyl-1-propenyl)oxy]trimethylsilane; [(1- methoxy-2-methyl-1-propenyl)oxy]dimethyloctadecylsilane; [(1-methoxy-2-methyl-1-propenyl)oxy]methylsilane; 2-(trimethylsilyl)isobutyronitrile; ethyl 2-(trimethylsilyl)acetate; methyl 2-methyl-2-(tributylstannyl)propanoate; [(2-methyl-1-cyclohexenyl)oxy]tributylstannane; trimethylsilyl nitrile; methyl 2-methyl-2-(trimethylgermanyl)propanoate; [(4,5-dihydro-2-furanyl)oxy]trimethylsilane; [(2-methyl-1-propenylidene)bis(oxy)]bis[trimethylsilane]; [(2-methyl-1-[2-(methoxymethoxy)ethoxy]-1-propenyl)oxy]trimethylsilane; methyl [(2-methyl-1-(trimethylsilyloxy)-1-propenyl)oxy]acetate; [(1-methoxymethoxy)-2-methyl-1-propenyl)oxy]trimethylsilane; trimethyl α,α',α"-tris(trimethylsilyl)-1,3,5-benzenetriacetate; dimethyl α,α'-bis(trimethylsilyl)-1,3-benzenediacetate; [1,6-dimethoxy-1,5-hexadiene-1,6-diylbis(oxy)]bis[trimethylsilane]; [(2-ethyl-1-propoxy-1-butenyl)oxy]ethyldimethylsilane; ethyl 2-(trimethylstannyl)propanoate; [(1-cyclohexenyl)oxy]trimethylstannane; [(2-methyl-1-butenylidene)bis(oxy)]bis[trimethylsilane]; 2-(trimethylsilyl)propanenitrile; ethyl (trimethylgermanyl)acetate; [(1-((1-dec-2-enyl)oxy)-2-methyl-1-propenyl)oxy]trimethylsilane; phenyl 2-methyl-2-(tributylstannyl)propanoate; methyl 2-(triethylsilyl)acetate; dimethyl 2,5-bis(trimethylgermanyl)hexanedioate; [(2-methyl-1-cyclohexenyl)oxy]tributylstannane; [(1-methoxy-2-methyl-1-propenyl)oxy]phenyldimethylsilane; [(2-methyl-1-[2-(trimethylsiloxy)ethoxy]-1-propenyl)oxy]trimethylsilane; N,N-dimethyl-(trimethylsilyl)phosphorodiamidite; (trimethylsilyl)dimethyl phosphite; tris(trimethylsilyl) phosphite; N,N-dimethyl-P-[3-methoxy-3-((trimethylsilyl)oxy)-2-propenyl]phosphonic diamide; N,N-dimethyl-P-[3-methoxy-2-methyl-3-((trimethylsilyl)oxy)-2-propenyl]phosphonic diamide; [3-methoxy-3-((trimethylsilyl)oxy)-2-propenyl]phosphonic acid, bis(trimethylsilyl) ester; [3-methoxy-2-methyl-3-((trimethylsilyl)oxy)-2-propenyl]phosphonic acid, bis(trimethylsilyl) ester; [3-methoxy-3-((trimethylsilyl)oxy)-2-propenyl]phosphonic acid, diethyl ester; [(2-(1,1-dimethylethyl)-5-phenyl-1,3-dioxol-4-yl)oxy]trimethylsilane; [(2-methyl-5-phenyl-1,3-dioxol-4-yl)oxy]trimethylsilane; [(methoxy)(1,7,7-trimethylbicyclo[2.2.1]heptan-2-ylidene)methoxy]trimethylsilane; 1,3-bis[(1-methoxy-1-butenyl)oxy]-1,1,3,3-tetramethyldisiloxane; bis[(1-methoxy-2-methyl-1-propenyl)oxy]methylsilane; bis[(1-methoxy-2-methyl-1-propenyl)oxy]dimethylsilane.

Preferred initiators include [(1-methoxy-2-methyl-1-propenyl)oxy]trimethylsilane; [(2-methyl-1-propenylidene)bis(oxy)]bis[trimethylsilane]; trialkylsilyl nitriles; and [(2-methyl-1-[2-(trimethylsiloxy)ethoxy]-1-propenyl)oxy]trimethylsilane. Trimethylsilyl nitrile is most preferred.

The initiators used in the invention are either known compounds or can be prepared by known methods from known starting materials. Of the initiators listed above, trimethylsilyl nitrile and ethyl trimethylsilyl acetate are commercially available. Initiators of the aforesaid formula $(R^1)_3MZ$ wherein Z is

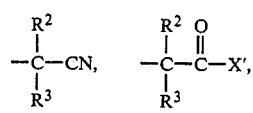

or the corresponding ketene imine or enol isomeric forms

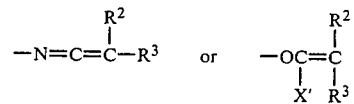

wherein X' is defined as above can be prepared from nitriles $(R^2)(R^3)$ CHCN, esters, ketones, or substituted amides $(R^2)(R^3)CHC(O)X'$ wherein X' is as defined above by reaction with, for example, n-butyllithium or lithium diisopropylamide, followed by reaction with a halide of the formula $(R^1)_3MCl$ wherein $R^1$ and M are as defined above.

Initiators of the aforesaid formula wherein $R^2$ or $R^3$ is $CH_3$ also can be prepared from the monomers using appropriate procedures. For example, $CH_2=C(R^3)C(O)X'$ can be reacted with $(R^1)_3MH$ wherein $R^1$ is as defined above to produce $(R^1)_3MZ$ wherein Z is

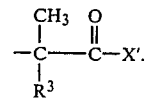

In still another method, the preferred initiators which are trialkylsilyl nitriles can be prepared in situ by treating a trialkylsilyl chloride with an excess of cyanide ion from a suitable source, such as tetraalkylammonium cyanide. The residual cyanide ion can serve as a co-catalyst for the polymerization.

Similarly, initiators of the formulas $(R^1)_2M(Z^1)_2$ or $O[M(R^1)_2Z^1]_2$ wherein $R^1$, M and $Z^1$ are as defined above are either known compounds or can be prepared by the above methods employing, for example: dihalides of the formula $(R^1)_2MCl_2$ in place of halides $(R^1)_3MCl$ in the reaction with lithium-containing intermediates as described above; or dihydrides $(R^1)_2HM-O-MH(R^1)_2$ in place of $(R^1)_3MH$ in the reaction with the monomers $CH_2=C(R^3)C(O)X'$.

Useful initiators of the invention include those wherein the activating substituent Z or $Z^1$ also contains one or more reactive initiating substituents, resulting in branched polymers. Such initiators can be prepared in situ by reacting a monomeric compound containing at least one reactive substituent with a "simple" initiator $(R^1)_3MZ$, or precursor thereof, containing at least one initiating site.

It is to be understood that the useful initiators include nitriles, esters, amides, and ketones, and their corresponding ketene imine and enol forms, all of which are active in the polymerization process of this invention. Moreover, the initiators wherein the activating moiety Z contains R, $R^2$, and/or $R^3$ can also have, like the monomer, one or more functional substituents attached to an aforesaid R group, provided such substituents do not interfere with polymerization. Functional substituents which are useful include, but are not limited to, $-OSi(R^1)_3$, $-CO_2R$, $-OC(O)R$, $-NR'R''$, $-C(O)NR'R''$, $-CN$, $-OCH(R)OR$, $-OC(R)(R)OR$,

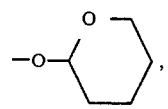

$-CO_2Si(R^1)_3$,

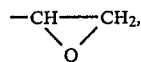

—C(CH$_3$)=CH$_2$, —SR, —P(O)NR'R'')$_2$, —P(O)-[OSi(R$^1$)$_3$]$_2$ and —P(O)(OR$^1$)$_2$. Such substituents, either directly or after treatment, for example, hydrolysis, provide functional sites along or at the end of polymer chains suitable for cross-linking, chain extension, chain branching, or for modifying properties such as water sorption, UV absorption, and the like. In the practice of this invention, as described below, an initiator moiety forms one end of a polymer chain or branch and hence said polymers can be terminally or centrally functionalized by appropriate initiator selection and polymer treatment.

The co-catalysts used in the invention process are either known compounds or can be prepared by known methods from known compounds. Suitable, that is, effective, co-catalysts which have been independently discovered and which are useful in the invention process include zinc iodide, bromide, and chloride, mono- and dialkylaluminum halides, dialkylaluminum oxides, tris(dimethylamino)sulfonium difluorotrimethylsilicate, tris(dimethylamino)sulfonium cyanide, tetraphenylarsonium cyanide, tris(dimethylamino)sulfonium azide, tetraethylammonium azide, boron trifluoride etherate, alkali metal fluorides, alkali metal cyanides, alkali metal azides, tris(dimethylamino)sulfonium difluorotriphenylstannate, tetrabutylammonium fluoride, tetramethylammonium fluoride, and tetraethylammonium cyanide. Preferred co-catalysts include sources of fluoride ions, especially tris(dimethylamino)sulfonium difluorotrimethyl silicate and tetrabutylammonium fluoride; tetraalkylammonium cyanides; zinc bromide, and zinc chloride.

Most preferred co-catalysts are sources of bifluoride ions, such as, for example, tris(dimethylamino)sulfonium bifluoride, bifluorides of the alkali metals, especially potassium, ammonium bifluoride, tetraalkylammonium bifluorides and tetraarylphosphonium bifluorides. Tris(dimethylamino)sulfonium bifluoride may be prepared by reacting tris(dimethylamino)sulfonium difluorotrimethylsilicate with water or a lower alkanol, for example, methanol; water is preferred since higher yields are obtained.

The process of the invention is carried out at about −100° C. to about 150° C., preferably 0° C. to 50° C., most preferably at ambient temperature. A solvent is desirable but not essential.

Suitable solvents are aprotic liquids in which the monomer, initiator and co-catalyst are sufficiently soluble for reaction to occur; that is, the materials are dissolved at the concentrations employed. Suitable solvents include ethyl acetate, propionitrile, toluene, xylene, bromobenzene, dimethoxyethane, diethoxyethane, diethylether, tetramethylene sulfone, N,N-dimethylformamide, N,N-dimethylacetamide, N-methylpyrrolidone, anisole, 2-butoxyethoxytrimethylsilane, cellosolve acetate, crown ethers such as 18-crown-6, acetonitrile, and tetrahydrofuran. Acetonitrile and tetrahydrofuran are preferred solvents when a co-catalyst wherein the active species is an anion is used. When the co-catalyst employed is a zinc compound, suitable solvents are limited to hydrocarbons and chlorinated hydrocarbons, preferably dichloromethane or 1,2-dichloroethane.

The monomers used in the process of the invention are generally liquids and can be polymerized without a solvent, although a solvent is beneficial in controlling temperature during exothermic polymerization. When a solvent is used, the monomer may be dissolved or dispersed therein at concentrations of at least 1 wt %, preferably at least 10 wt %. The initiator is employed at a concentration such that the monomer/initiator molar ratio is greater than 1, preferably greater than 5. The co-catalyst is normally present in such an amount that the molar ratio of initiator to co-catalyst is in the range 0.1 to 10,000, preferably 10 to 100.

In the polymerization process of the invention, it is preferable to charge the initiator, co-catalyst, and solvent, if used, to the polymerization vessel before adding the monomer(s), especially if polymers of narrow molecular weight distribution are desired. In selected cases, such as the polymerization of methyl methacrylate initiated by trimethylsilyl nitrile using a relatively low concentration of cyanide or fluoride ions as the co-catalyst, polymerization takes place after an induction period of several minutes. In such cases, all materials, including the monomer(s), may be charged together or independently, and mixed in place. Such an initiator/co-catalyst system is preferred to obtain relatively monodisperse polymers. By a monodisperse polymer is meant one having a narrow molecular weight distribution, that is, $\overline{M}_w/\overline{M}_n$ is about 1. At higher values of $\overline{M}_w/\overline{M}_n$ the polymer is said by the art to be polydisperse.

Although, as indicated above, it is preferable to charge all necessary initiator, co-catalyst and solvent to the polymerization vessel before adding monomer(s), subsequent polymerization rate being controlled by monomer addition, further additions of co-catalyst may sometimes be necessary to sustain polymerization.

The final (non-living) polymeric product obtained by means of the process of the invention is formed by exposing the "living" polymer to an active hydrogen source, such as moisture or an alcohol, for example, methanol.

The "living" polymers of the invention will remain "living" for substantial periods provided they are protected from active hydrogen sources such as water or alcohols. Solutions of "living" polymers in inert solvents, such as hydrocarbons, are especially useful for preserving and conveying the "living" polymers. Films and fibers of the "living" polymers may be cast or spun from such solutions, or the polymer may be isolated from solution and further processed, for example, pelletized or granulated.

It is to be understood that the final (non-living) polymeric product does not include the enol or imine species of Q in the aforesaid formula for the "living" polymer of the invention. For example (as in Example 7), a "living" polymer prepared by polymerizing methyl methacrylate using [(1-methoxy-2-methyl-1-propenyl)oxy]-trimethylsilane (MTS) as the initiator contains, at its living end, the enolic grouping

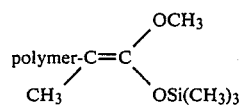

which, upon quenching, is converted to

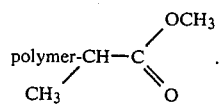

The process of the invention is useful for preparing homopolymers or copolymers of the monomers described above. In either case, the polymers obtained are "living" polymers which may be of high or low molecular weight and having a broad or narrow molecular weight distribution ($\overline{M}_w/\overline{M}_n$). At a given temperature, $\overline{M}_w/\overline{M}_n$ is primarily a function of the relative rates of initiation and polymerization. Rate of initiation, $r_i$, depends on initiator and co-catalyst type and relative concentrations. Polymerization rate, $r_p$, is a function of monomer reactivity and co-catalyst type and concentration. For monodispersity, $r_i/r_p$ is equal to or greater than 1, that is, the initiation rate is at least as fast as the polymerization rate and all chains grow simultaneously. Such conditions characterize the preparation of "living" polymers by anionic polymerization techniques of the art wherein $\overline{M}_w/\overline{M}_n$ ratios only slightly above the theoretical limit of 1 are obtainable; for example, poly(methyl methacrylate) of $\overline{M}_w/\overline{M}_n$ of about 1.01 to 1.1 are known in the art, as are copolymers of methyl methacrylate and other alkyl methacrylates. Control of $\overline{M}_w/\overline{M}_n$ permits useful variation in polymer physical properties, such as glass transition temperature, hardness, heat distortion temperature, and melt viscosity.

The polymerization process of the present invention involves a "living" mechanism having several similarities with anionic polymerization. For example, initiation and polymerization may be represented by conventional equations wherein the initiator moiety $(R^1)_3M$ is located at one end of the polymer chain or branch which remains "living" even when the monomer supply is consumed; the activating substituent Z is located at the other end of the polymer chain or branch. The terminal initiator moiety, unless chemically deactivated, is capable of initiating further polymerization with the same or different monomer, with resultant chain lengthening. Copolymers with specific monomer sequences, or block polymers, can thus be prepared.

Although the present process resembles anionic polymerization, there are significant differences which have commercial significance. These differences include the ability to copolymerize methacrylate and acrylate monomers, or combinations of acrylate monomers, for example, ethyl and sorbyl acrylates, to relatively monodisperse copolymers. Such copolymers are difficult or impossible to obtain by known processes such as anionic polymerization or free-radical polymerization. Moreover, whereas anionic polymerization processes which provide relatively monodisperse polymers are carried out at low temperatures, usually well below $-10°$ C., which require expensive refrigeration equipment for commercial operation, the polymerization process of the invention is operable over a wide temperature range, from about $-100°$ C. to about $150°$ C. It is conveniently operable with many commercially important monomers at about ambient temperatures.

The process of this invention can also be used to prepare polymers containing one or more specifically located functional groups which are unreactive under polymerizing conditions but are useful for subsequent preparation of block copolymers or crosslinked polymers. The functional groups may be introduced by using either a monomer or an initiator, or both, containing a protected functional substituent, or by chemically deactivating (capping) the "living" end of the polymer chain or branch with a functionalized capping agent. If the capping agent contains more than one capping site, then more than one polymer chain can be joined together or coupled to give doubled or "star"-branched polymers, similar to the doubled or star-branched polymers obtained when the initiator contains more than one initiating site, or the monomer contains more than one reactive site capable of reacting with initiators, as described previously. Even if the capping agent contains only one capping site, the agent may also contain other functional groups which provide reactive terminal sites to the polymer, useful for subsequent preparation of block copolymers or cross-linked polymers, or for otherwise modifying polymer properties. Examples of capping agents containing one or more capping sites include p-dimethoxymethylbenzyl bromide, p-chloromethylstyrene, p-methoxymethoxymethylbenzyl bromide, 1,4-bis(bromomethyl)benzene, 1,3,5-tris(bromomethyl) benzene, terephthaldehyde and toluene diisocyanate. Capping agents containing one capping site and one or more functional groups that are unreactive under capping conditions include
1-bromomethyl-4-dimethoxymethylbenzene,
1-bromomethyl-4-(methoxymethoxymethyl)benzene,
4-chloromethylstyrene,
4-(trimethylsilylcarboxy)benzaldehyde,
4-nitrobenzaldehyde, 2,5-furanyldione and
1,3-di(carbonylamino)-1,5,5-trimethylbenzene.
In general, capping agents which are useful in the process of the invention include aliphatic, aromatic or aliphatic-aromatic compounds containing one or more capping functions such as —CHO,

—NCO, —Br, —Cl and —TiCl$_3$, and which may optionally also contain non-capping functional substituents, such as —NO$_2$, —OSi(R$^1$)$_3$ and —CO$_2$Si(R$^1$)$_3$. Reaction of capping agents with the "living" polymer ends proceeds similarly to known reactions of nonpolymeric trialkylsilanes. The capping reaction is normally carried out in an organic liquid wherein both polymer and capping agent are soluble; frequently, the polymerization solvent is suitable. The reaction is preferably carried out in the presence of fluoride ion as catalyst; tris(dimethylamino)sulfonium difluorotrimethylsilicate is a preferred catalyst. Examples of initiators which can initiate more than one polymer chain include trimethyl α,α'α"-tris(trimethylsilyl)-1,3,5-benzenetriacetate, dimethyl α,α'-bis(trimethylsilyl)-1,3-benzenediacetate, 1,6-dimethoxy-1,5-hexadiene-1,6-diylbis(oxy)-bis[trimethylsilane], and bis[(1-methoxy-2-methyl-1-propenyl)oxy]methylsilane.

In the following examples of specific embodiments of this invention, parts and percentages are by weight and temperatures are in degrees Celsius unless otherwise specified. The polydispersity (D) of the polymer products of the examples is defined by D=$\overline{M}_w/\overline{M}_n$, the molecular weights being determined by gel permeation chromatography (GPC). Unless otherwise specified, the "living" polymer products obtained in the invention process were quenched by exposure to moist air before molecular weights were determined.

EXAMPLE 1

Preparation of "Living" Poly(Methyl Methacrylate) and Subsequent Reactions Thereof This example demonstrates the preparation of "living" poly(methyl methacrylate) containing active terminal trimethylsiloxy groups, and subsequent reactions thereof.

A. "Living" Poly(methyl methacrylate)

To a solution of 2.6 g (9.4 mmol) of [(2-methyl-1-[2-(trimethylsiloxy)ethoxy]-1-propenyl)oxy]trimethylsilane in 10 ml of THF was added 166 mg of tris(dimethylamino)sulfonium bifluoride. Then, a solution of 10 g (100 mmol) of MMA in 10 ml of THF was added dropwise over 30 min. After the temperature dropped to 22°, the reaction mixture containing PMMA was separated into three equal parts, under argon, for use in Parts B, C and D below.

B. Reaction with Bromine and Titanium Tetrachloride

The reactions involved are shown below. In all equations, R is

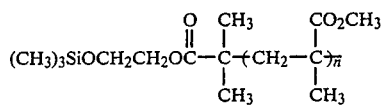

(i) Bromine reacts with approximately one-half of the living polymer in the 11.1 ml aliquot of polymerization mixture from Part A:

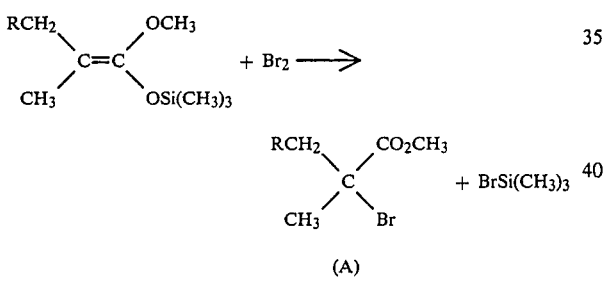

(A)

(ii) The remaining living polymer in the 11.1 ml aliquot from Part A reacts with TiCl$_4$:

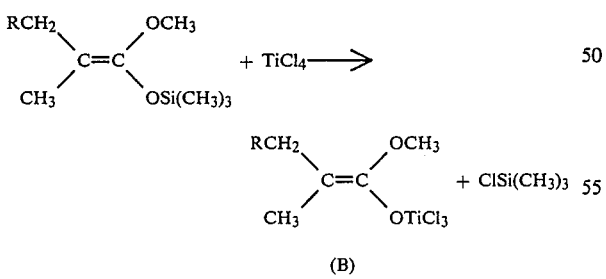

(B)

(iii) Coupling:

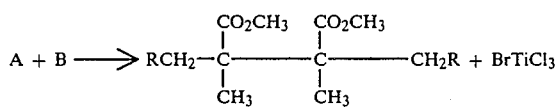

One-third of the polymerization mixture from Part A (11.1 ml) was cooled to 0° and treated with 0.3 g (1.9 mmol) of bromine in 5 ml of 1,2-dichloroethane. After the red bromine color disappeared, a solution of 0.4 ml of TiCl$_4$ in 5 ml of 1,2-dichloroethane was added, whereupon a precipitate formed. The mixture was allowed to warm to room temperature, stirred for 1 h, and then evaporated. The residue was dissolved in 20 ml of acetone and precipitated from hexane to give 4.45 g of polymer. This was identified by HPLC, NMR and GPC to be a di(trimethylsilyloxy)-PMMA, hydrolyzable to dihydroxy PMMA. GPC: $\overline{M}_n$ 3600, $\overline{M}_w$ 4400, D 1.23 (theor. $\overline{M}_n$ 2392).

C. Reaction with Benzyl Bromide (Capping)

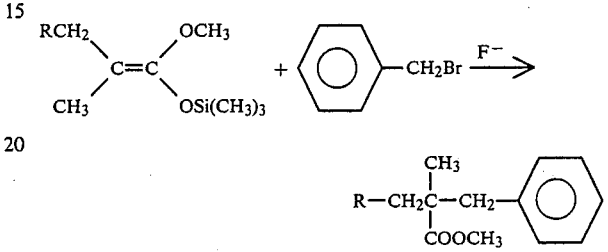

R has the same meaning as in Part B.

An aliquot (11.1 ml) of original polymerization reaction mixture from Part A was cooled to $-43°$ under argon. To this was added 0.7 g of benzyl bromide. The solution was stirred and allowed to warm to room temperature. After stirring for 15 min 3.5 ml of a 1.0M acetonitrile solution of tris(dimethylamino)sulfonium difluorotrimethylsilicate was added. The solution was stirred at 25° for 1½ h, after which was added 10 ml of methanol. The solvents were evaporated and the polymer was precipitated from hexane; 4.25 g of powdery solid polymer was recovered. GPC: $\overline{M}_n$ 2300, $\overline{M}_w$ 3700, D 1.61 (theor. $\overline{M}_n$ 1287).

D. Reaction with 1,4-Xylyl Bromide

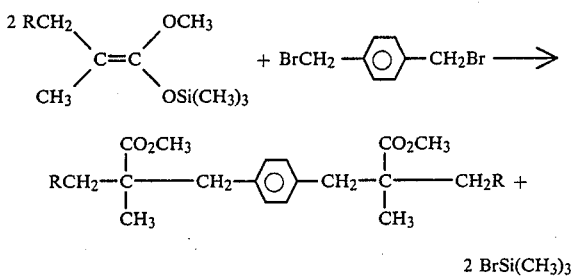

2 BrSi(CH$_3$)$_3$

R has the same meaning as in Part B.

Following the procedure of Part B, 11.1 ml of the reaction mixture was treated with 0.5 g (1.9 mmol) of 1,4-xylyl bromide, 1.1 g of tris(dimethylamino)sulfonium difluorotrimethylsilicate to give 4.31 g of α,ω-masked-dihydroxy PMMA.

GPC: $\overline{M}_n$ 3400, $\overline{M}_w$ 4200, D 1.24 (theor. $\overline{M}_n$ 2494).

EXAMPLE 2

Preparation of Three-Branched Star Poly(methyl methacrylate)

A. To 4.41 ml (3.838 g, 12.87 mmol) of tris(trimethylsilyl)phosphite at 65° was added slowly 1.0 g (4.29 mmol) of trimethylolpropanetriacrylate (purified by extraction with hexane and passage of extract through neutral alumina). After 1 h, NMR showed no residual acrylate and was in agreement with

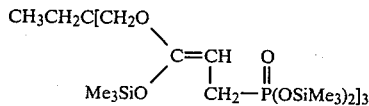

a viscous oil.

Anal. Calcd. for $C_{42}H_{101}O_{15}P_3Si_9$: C, 42.32; H, 8.54; P, 7.80; Si, 21.21. Found: C, 41.05; H, 8.17; P, 8.87; Si, 19.91.

B. To a solution of 1.91 g (1.6 mmol) of the product of Part A in 30 ml of tetrahydrofuran was added 0.1 ml of 1M tris(dimethylamino)sulfonium bifluoride/acetonitrile and 15 g (16.2 ml, 150 mmol) of methyl methacrylate. A slow exothermic reaction was observed. After stirring 18 h, the solution was evaporated in vacuo to 12.6 g (80.7%) of solid polymer.

GPC: $\overline{M}_n$ 13,000, $\overline{M}_w$ 28,600, D 2.20 (theoretical $\overline{M}_n$ 7500).

To convert the silylphosphonate terminal groups to phosphonic acid groups, the product was stirred at reflux for 1 h with 15 ml of methylene chloride, 6 ml of methanol, and 1 ml of 1M tetrabutylammonium fluoride/tetrahydrofuran. The solution was evaporated and the residue was dissolved in methylene chloride, washed with water, dried and concentrated. The purified three-star triphosphonic acid polymer was precipitated with hexane to give 6 g of solid polymer. The NMR spectrum showed the absence of any trimethylsilyl groups.

EXAMPLE 3

Preparation of a Triblock Terpolymer of Methyl Methacrylate (MMA), n-Butyl Methacrylate (BMA), and Allyl Methacrylate (AMA), Catalyzed by Bifluoride Ion A 250 ml reactor, fitted with an argon inlet, a stirrer, thermocouple and a syringe pump, was charged with tetrahydrofuran (50 ml), tris(dimethylamino)sulfonium bifluoride (0.05 ml, 1M in $CH_3CN$) and [(2-methoxy-2-methyl-1-propenyl)oxy]trimethylsilane (1.25 ml, 6.25 mmol). MMA (10.7 g, 106.9 mmol) was then added via a syringe pump over 15 minutes. The temperature rose from 24.8° to 51.6° accompanied by an increase in the viscosity of the mixture. The reaction mixture was stirred and allowed to cool to 38.6°. Then BMA (9.0 g, 63.3 mmol) was added over 15 minutes. The temperature rose to 43.2°. The addition process was repeated with AMA (5.34 g, 42.5 mmol) and the temperature rose from 33° to 39.2°. The clear colorless mixture was stirred until the temperature dropped to 23° and then was treated with methanol (10 ml) containing phenothiazine (0.1 mg). The solvent was evaporated and the residue was dried; yield 23.72 g. $\overline{M}_n$ 3800, $\overline{M}_w$ 4060, D 1.07 (theoretical $\overline{M}_n$ 4100). The polymer showed $Tg_1$ −19°, $Tg_2$ 38°, $Tg_3$ 108°, corresponding to poly(allyl methacrylate), poly(n-butyl methacrylate) and poly(methyl methacrylate) segments, respectively.

EXAMPLE 4

Polymerization of Methyl Methacrylate with Bis[(1-methoxy-2-methyl-1-propenyl)oxy]methylsilane and tris(dimethylamino)sulfonium Bifluoride To a solution, in 20 ml of anhydrous tetrahydrofuran, of bis[(1-methoxy-2-methyl-1-propenyl)oxy]methylsilane (1.23 g, 5 mmol), prepared by the reaction of methyldichlorosilane with the lithium enolate of methyl isobutyrate (bp 54.8°/0.5°–57.2°/0.7 mm), and 20 μL of 1M tris(dimethylamino)sulfonium bifluoride/acetonitrile was added 10 g (10.8 ml, 100 mmol) of methyl methacrylate (purified by passage over neutral alumina under argon) containing 10 μl of 1M tris(dimethylamino)sulfonium bifluoride. An exothermic reaction persisted during the monomer addition. After 30 minutes 5.0 g (5.4 ml, 50 mmol) of methyl methacrylate was added, producing an exothermic reaction. Addition of 3 ml of methanol produced an apparent decrease in viscosity. Evaporation in vacuo gave 17.5 g of solid poly(methyl methacrylate).

Gel permeation chromatography shows $\overline{M}_n$ 1410, $\overline{M}_w$ 1550, D 1.10 (theoretical $\overline{M}_n$ 1600).

EXAMPLE 5

Polymerization of Methyl Methacrylate with [3-methoxy-2-methyl-3-((trimethylsilyl)oxy)-2-propenyl]phosphonic Acid, Bis(trimethylsilyl) Ester and Tris(dimethylamino)sulfonium Bifluoride A. [3-Methoxy-2-methyl-3-((trimethylsilyl)oxy)-2-propenylphosphonic acid, bis(trimethylsilyl) ester was prepared by stirring a mixture of equimolar amounts of methyl methacrylate and tris(trimethylsilyl)phosphite at 114° for 3.5 h under argon. The product was distilled in a small Vigreux column, b.p. 91°/0.23 mm, Anal. Calcd. for $C_{14}H_{35}O_5PSi_3$: C, 42.18; H, 8.85; P, 7.77, Si 21.14. Found: C, 42.17; H, 8.54, P, 8.07; Si 21.12.

B. To a stirred solution of 3.12 g (3.2 ml, 7.84 mmol) of the phosphonic acid ester prepared in Part A and 0.3 ml of a 1M solution in acetonitrile of tris(dimethyamino)sulfonium bifluoride in 100 ml of tetrahydrofuran under an argon atmosphere was added during 1 h 55 ml (50.9 g, 509 mmol) of methyl methacrylate (purified by passage over a short column of neutral alumina). The solution was stirred for two h after the end of the exotherm. Then, 30 ml of methanol and 2 ml of 1M tetrabutylammonium/tetrahydrofuran was added and the resulting solution was stirred at reflux for 1.5 h and concentrated in a rotary evaporator. The product was precipitated from the concentrated solution by addition to water. The polymer was filtered and dried in a vacuum oven at 100° to give 49.7 g of poly(methyl methacrylate-1-phosphonic acid). GPC: $\overline{M}_n$ 5900, $\overline{M}_w$ 5900, D 1.00 (theoretical $\overline{M}_n$ 6650); $^1H$ NMR: δ(ppm from external $Me_4Si$, $CDCl_3$ solvent) 7.9 ppm [broad, $PO(OH)_2$].

EXAMPLE 6

Polymerization of Methyl Methacrylate with Tris(trimethylsilyl)phosphite and Bifluoride Catalyst To a stirred solution of 1.49 g (1.75 ml, 5 mmol) of tris-(trimethylsilyl)phosphite and 0.31 ml of 1M tris(dimethylamino)sulfonium bifluoride/acetonitrile in 15 ml of tetrahydrofuran under argon was added 10 g (10.8 ml, 100 mmol) of methyl methacrylate. After 20 minutes an exothermic reaction was observed, and the temperature rose to 36°. After stirring 18 h the viscous solution was evaporated in vacuo to 12.1 g of solid phosphonate-substituted poly(methyl methacrylate). GPC: $\overline{M}_n$ 15,300, $\overline{M}_w$ 29,400, D 1.92 (theoretical $\overline{M}_n$ 2300).

EXAMPLE 7

Polymerization of Methyl Methacrylate and Isolation of Trimethylsiloxy-ended Polymer This example demonstrates by means of carbon-13 NMR analysis the presence of silylenolate terminal groups in a "living" polymer prepared by the process of this invention.

A. To a suspension of 20 mg (0.1 mmol) of tris(dimethylamino)sulfonium bifluoride in 5 ml of THF was added, under argon, 1.0 ml (5 mmol) of MTS. Then, 2.7 ml (25 mmol) of MMA was added, whereupon the temperature rose from 22° to 50°. The mixture was stirred until the temperature dropped to 22°. Then, the reaction vessel was connected to a vacuum pump and the solvents were removed at 0.1 mm Hg using a liquid nitrogen trap. A foamy polymer, 3.5 g, was obtained. This was subjected to C-13 NMR analysis.

MTS was used as a standard and the assignment of peaks is shown below:

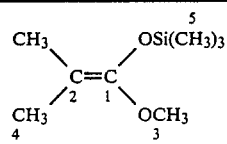

| Carbon | C-13 Shielding (ppm) |
|---|---|
| C-1 | 49.50 |
| C-2 | 90.40 |
| C-3 | 56.17 |
| C-4 | 16.61, 15.84 |
| C-5 | −0.20 |

The most distinct and useful peaks are those corresponding to the sp2-hybridized carbon atoms occurring at 90.40 and 149.50 ppm. The absorption of the corresponding carbon atoms of the "living" polymer should occur in about the same spectral region.

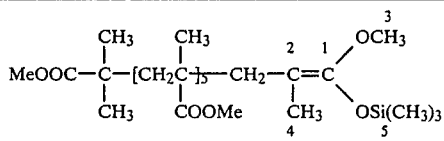

| Carbon | C-13 Shielding (ppm) |
|---|---|
| C-1 | 151.1 |
| C-2 | 88.5 |
| C-3 | 59.6 |
| C-4 | 28.1 |
| C-5 | −1 to −1.5 |

As shown above, distinct peaks occurred at 151.1 and 88.5 ppm, corresponding to the carbon atoms of the C=C moiety. The C=O absorption of the ester groups of the polymer occurred between 175 and 176 ppm as multiplets. Integration of the peaks due to C=O versus those due to C=C gave a degree of polymerization of about 6. The isolated polymer (3.5 g) was dissolved in 10 ml of THF and then treated with 5 ml of methanol. Upon evaporation and drying, 3.3 g of polymer was obtained. GPC: $\overline{M}_n$ 550, $\overline{M}_w$ 600, D 1.09 (theor. $\overline{M}_n$ 602).

B. Following the procedure of Part A, trimethylsiloxy-ended poly(ethyl acrylate) was isolated from the reaction of 20 mg (0.1 mmol) of tris(dimethylamino)sulfonium bifluoride, 1.0 ml of MTS, and 2.7 ml of ethyl acrylate in 5 ml of THF. The assignment of peaks in the C-13 NMR is shown below:

| Model | "Living" poly(ethyl acrylate) |
|---|---|
| CH₃  OSiMe₃  \C=C/  /2  1\  H   OEt | polymer-CH₂  OSiMe₃  \C=C/  /2  1\  H   OEt |

| | C-13 Shieldings (ppm) | |
|---|---|---|
| Carbon | Model | Living PEA |
| C-1 | 164.2 | 167.2 |
| C-2 | 107.2 | 108.8 |

BEST MODE FOR CARRYING OUT THE INVENTION

The best mode presently contemplated for carrying out the invention is demonstrated and/or represented by Examples 1 to 4 and 7.

INDUSTRIAL APPLICABILITY

The invention process provides useful and well known polymers containing functional substituents, for example, homopolymers and copolymers of acrylate and/or methacrylate monomers, such polymers heretofore being made usually by anionic polymerization techniques. The invention process also provides a means for making certain commercially desirable, relatively monodisperse copolymers of methacrylate and acrylate comonomers, such copolymers being difficult or impossible to obtain by known processes such as anionic polymerization or free-radical polymerization. The invention process also provides "living" polymer which may be cast or spun, for example, into a film or fiber, from solution or dispersion (in or using an aprotic solvent) or isolated, processed, and then further polymerized. The solutions or dispersions may also be formulated with clear or opaque pigments and other ingredients which can be converted into protective coatings and finishes for manufactured articles, such as metal, glass and wood.

Although preferred embodiments of the invention have been illustrated and described hereinabove, it is to be understood that there is no intent to limit the invention to the precise constructions herein disclosed, and it is to be further understood that the right is reserved to all changes and modifications coming within the scope of the invention as defined in the appended claims.

What is claimed is:

1. In a process comprising polymerizing the monomer selected from the group consisting of CH₂=C(Y)X,

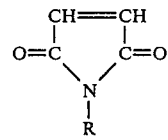

and mixtures thereof wherein:

X is —CN, —CH=CHC(O)X' or —C(O)X';
Y is —H, —CH₃, —CN or —CO₂R, provided, however, when X is CH=CHC(O)X', Y is —H or —CH₃;
X' is —OSi(R¹)₃, —R, —OR or —NR'R";

each $R^1$, independently, is hydrocarbyl of up to 20 carbon atoms;

R is hydrocarbyl of up to 20 carbon atoms, optionally containing one or more ether oxygen atoms within aliphatic segments thereof, and optionally containing one or more functional substituents that are unreactive under polymerizing conditions; and each of R' and R" is independently selected from $C_{1-4}$ alkyl by contacting the one or more monomers under polymerizing conditions with:

(i) the initiator of the formula $(R^1)_3MZ$ wherein:
$R^1$ is as defined above;
Z is an activating substituent selected from the group consisting of

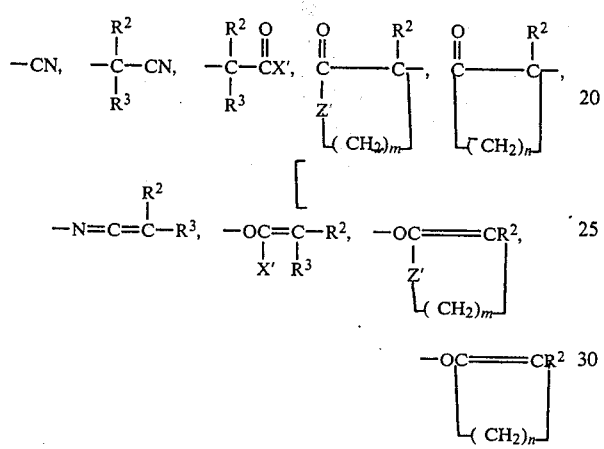

and mixtures thereof

X' is as defined above for the monomer;

each of $R^2$ and $R^3$ is independently selected from H and hydrocarbyl of up to 20 carbon atoms, optionally containing one or more ether oxygen atoms within aliphatic segments thereof, and optionally containing one or more functional substituents that are unreactive under polymerizing conditions; and Z' is O or NR';
m is 2, 3 or 4;
n is 3, 4 or 5; and
M is Si, Sn, or Ge,
provided, however when Z is

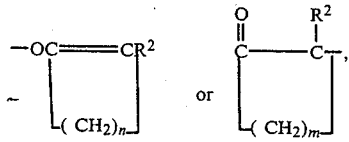

M is Sn or Ge; and (ii) a co-catalyst which is a source of bifluoride ions $HF_2^{\ominus}$, to produce "living" polymer having repeat units of the one or more monomers, said process further characterized in that:

(a) $R^1$ is H, provided that at least one $R^1$ group is not H; and/or (b) R is a polymeric radical containing at least 20 carbon atoms and optionally containing one or more ether oxygen atoms within aliphatic segments thereof and optionally containing one or more functional substituents that are unreactive under polymerizing conditions; and/or (c) at least one of any R group in the monomer contains one or more reactive substituents of the formula $-Z'(O)C-C(Y^1)=CH_2$ wherein $Y^1$ is H or $CH_3$ and Z' is as defined above; and/or (d) the initiator is of the formula $(R^1)_2M(Z^1)_2$ or $O[M(R^1)_2Z^1]_2$ wherein $R^1$ and M are as defined above and $Z^1$ is

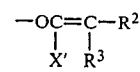

wherein X', $R^2$ and $R^3$ are as defined above; and/or (e) at least one of any R, $R^2$ and $R^3$ in the initiator contains one or more initiating substitutents of the formula $-Z^2-M(R^1)_3$ wherein
M and $R^1$ are as defined above; and
$Z^2$ is a diradical selected from the group consisting of

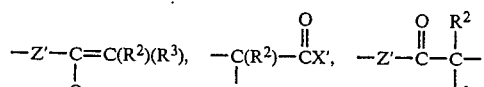

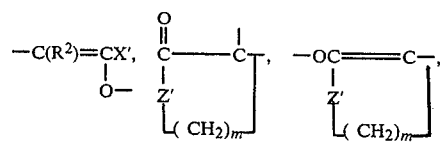

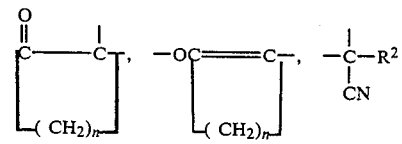

and mixtures thereof, wherein $R^2$, $R^3$, X', Z', m and n are as defined above, provided, however, when $Z^2$ is

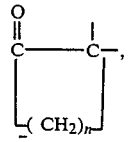

M is Sn or Ge; and/or (f) Z is selected from the group consisting of —SR, $-OP(NR'R")_2$, $-OP(OR^1)_2$, $-OP[OSi(R^1)_3]_2$ and mixtures thereof, wherein R, $R^1$, R' and R" are as defined above; and/or (g) $R^2$ and $R^3$ taken together are

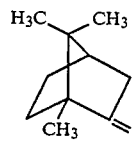

provided, however, Z is

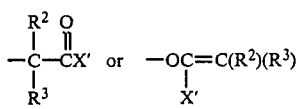

and/or $Z^2$ is

and/or (h) X' and either $R^2$ or $R^3$ taken together are

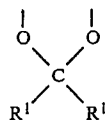

provided, however, Z is

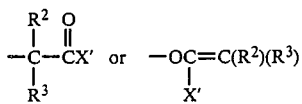

and/or $Z^2$ is

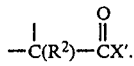

2. Process of claim 1 wherein at least one of said R, $R^2$ and $R^3$ groups contains one or more ether oxygen atoms within any aliphatic segment thereof.

3. Process of claim 1 wherein at least one of said R, $R^2$ and $R^3$ groups contains at least one functional substituent that is unreactive under polymerizing conditions.

4. Process of claim 1 wherein at least one of said R groups in the monomer(s) contains one or more reactive substituents.

5. Process of claim 1 wherein at least one of said R, $R^2$ and $R^3$ groups in the initiator contains one or more initiating substituents.

6. Process of claim 1 wherein the monomer is $CH_2=C(Y)X$ and M is Si.

7. Process of claim 6 wherein X is —C(O)X'.

8. Process of claim 7 wherein Y is —H or —$CH_3$.

9. Process of claim 8 wherein X' is —OR.

10. Process of claim 9 wherein R is substituted with at least one —OSi($R^1$)$_3$ or —C(O)OR group.

11. Process of claim 9 wherein R is substituted with at least one —OC(R)(R)OR, —OC(H)(R)OR or

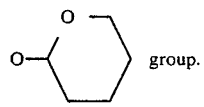

group.

12. Process of claim 9 wherein R is substituted with oxiranyl.

13. Process of claim 9 wherein R is $C_{1-20}$ alkyl, sorbyl, 2-methacryloxyethyl, 2-[(1-propenyl)oxy]ethyl, allyl or 2-(dimethylamino)ethyl.

14. Process of claim 9 wherein R contains one or more reactive substituents and Z' is —O—.

15. Process of claim 14 wherein R is a polymeric aliphatic hydrocarbon radical containing one or more ether oxygen atoms.

16. Process of claim 15 wherein R also contains one or more keto groups.

17. Process of claim 14 wherein R is $C_{1-10}$ alkyl.

18. Process of claim 17 wherein R is

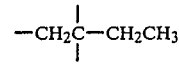

and contains two reactive substituents.

19. Process of claim 17 wherein R is —$CH_2$—$_{2-10}$ and contains one reactive substituent.

20. Process of claim 17 wherein R is

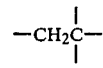

and contains three reactive substituents.

21. Process of claim 6 wherein X is —CN.

22. Process of claim 6 wherein Z is —CN.

23. Process of claim 6 wherein Z is —C($R^2$)($R^3$)CN.

24. Process of claim 23 wherein at least one of $R^2$ and $R^3$ is —H.

25. Process of claim 6 wherein Z is —C($R^2$)($R^3$)—C(O)X' or —OCX'=C($R^2$)($R^3$).

26. Process of claim 25 wherein at least one of $R^2$ and $R^3$ is H.

27. Process of claim 25 wherein $R^2$ and $R^3$ are $CH_3$.

28. Process of claim 25 wherein at least one of $R^2$ and $R^3$ contains one or more initiating substituents.

29. Process of claim 28 wherein, in the one or more initiating substituents, $R^1$ is $CH_3$, M is Si and $Z^2$ is

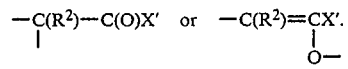

30. Process of claim 27 wherein X' in the initiator is —OSi($CH_3$)$_3$.

31. Process of claim 27 wherein X' in the initiator is —$OCH_3$.

32. Process of claim 29 wherein X' is —$OCH_3$ and $R^2$ is H.

33. Process of claim 32 wherein the initiating substituent is in $C_{1-4}$ alkyl.

34. Process of claim 32 wherein the initiating substituent is in a poly(caprolactone) radical of at least 20 carbon atoms.

35. Process of claim 32 wherein the one or two initiating substituents are in a phenyl radical.

36. Process of claim 6 wherein the initiator is ($R^1$)$_2$M($Z^1$)$_2$ or O[M($R^1$)$_2Z^1$]$_2$, M is Si, at least one of $R^1$ is $CH_3$ and $R^2$ and $R^3$ are $CH_3$.

37. Process of claim 6 wherein Z is —SR, —OP(NR'R")$_2$, —OP(O$R^1$)$_2$ or —OP[OSi($R^1$)$_3$]$_2$.

38. Process of claim 37 wherein $R^1$, R' and R" are $CH_3$.

39. Process of claim 25 wherein $R^2$ or $R^3$ is —$CH_2P(O)(NR'R'')_2$, —$CH_2P(O)[OSi(R^1)_3]_2$ or —$CH_2P(O)(OR^1)_2$.

40. Process of claim 39 wherein $R^2$ or $R^3$ is H or $CH_3$ and $R^1$, and $R''$ are $CH_3$.

41. Process of claim 7 wherein Z is

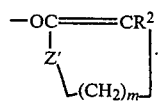

42. Process of claim 41 wherein $Z'$ is oxygen, $R^2$ is H and m is 2.

43. Process of claim 30 wherein at least one of $R^2$ and $R^3$ is substituted with at least one functional group that is unreactive under polymerizing conditions.

44. Process of claim 31 wherein at least one of $R^2$ and $R^3$ is substituted with at least one functional group that is unreactive under polymerizing conditions.

45. Process of claim 1 wherein $R^1$ is —$CH_3$.

46. Process of claim 45 wherein Z is —CN.

47. Process of claim 1 carried out at about $-100°$ C. to about $150°$ C.

48. Process of claim 47 carried out at 0° C. to 50° C.

* * * * *